Aug. 13, 1940.   W. J. COULTAS ET AL   2,210,973
CORN PICKER
Filed Jan. 12, 1939   4 Sheets-Sheet 1

INVENTORS
WILBUR J. COULTAS
NOLAN D. COLVIN
BY
ATTORNEYS.

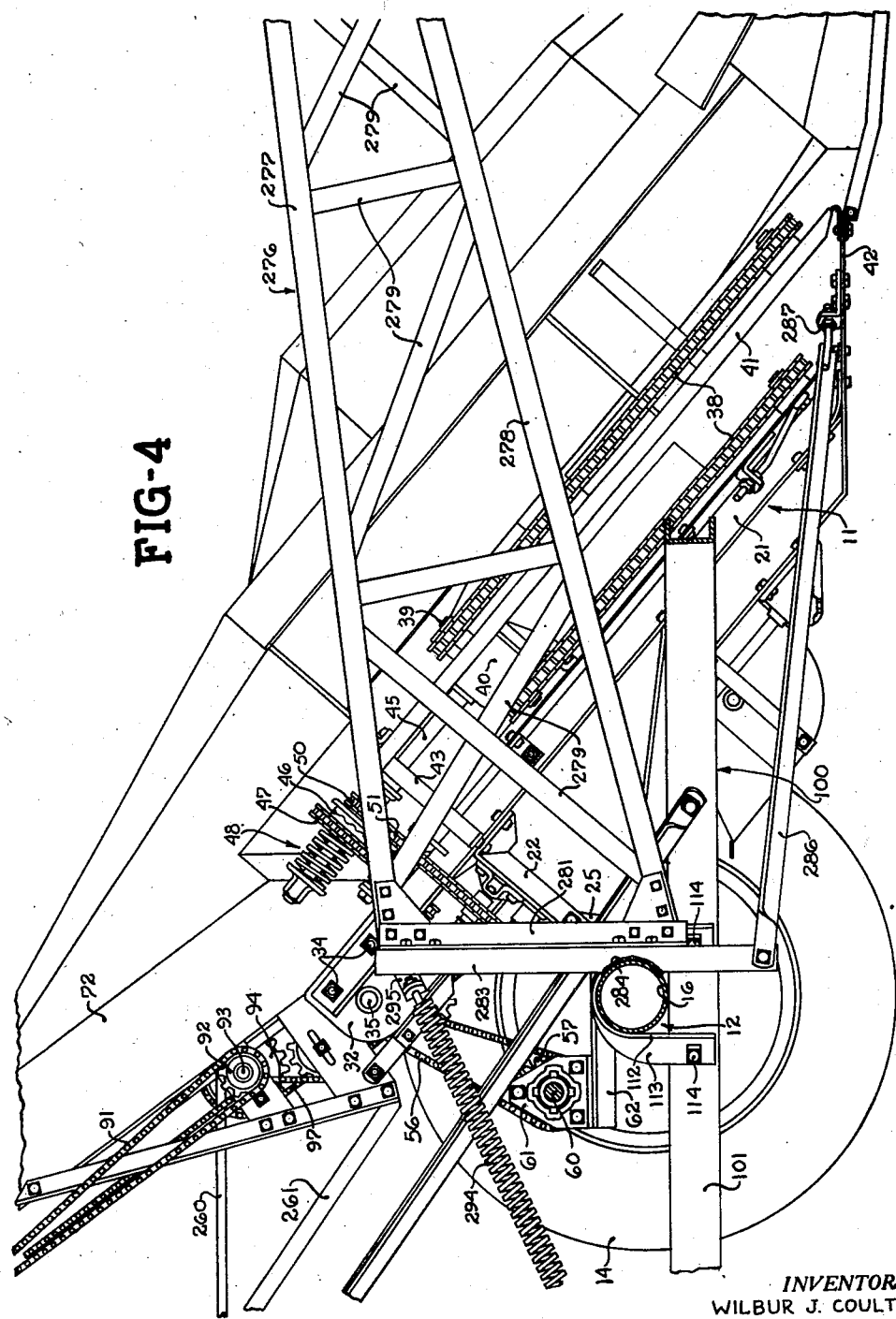

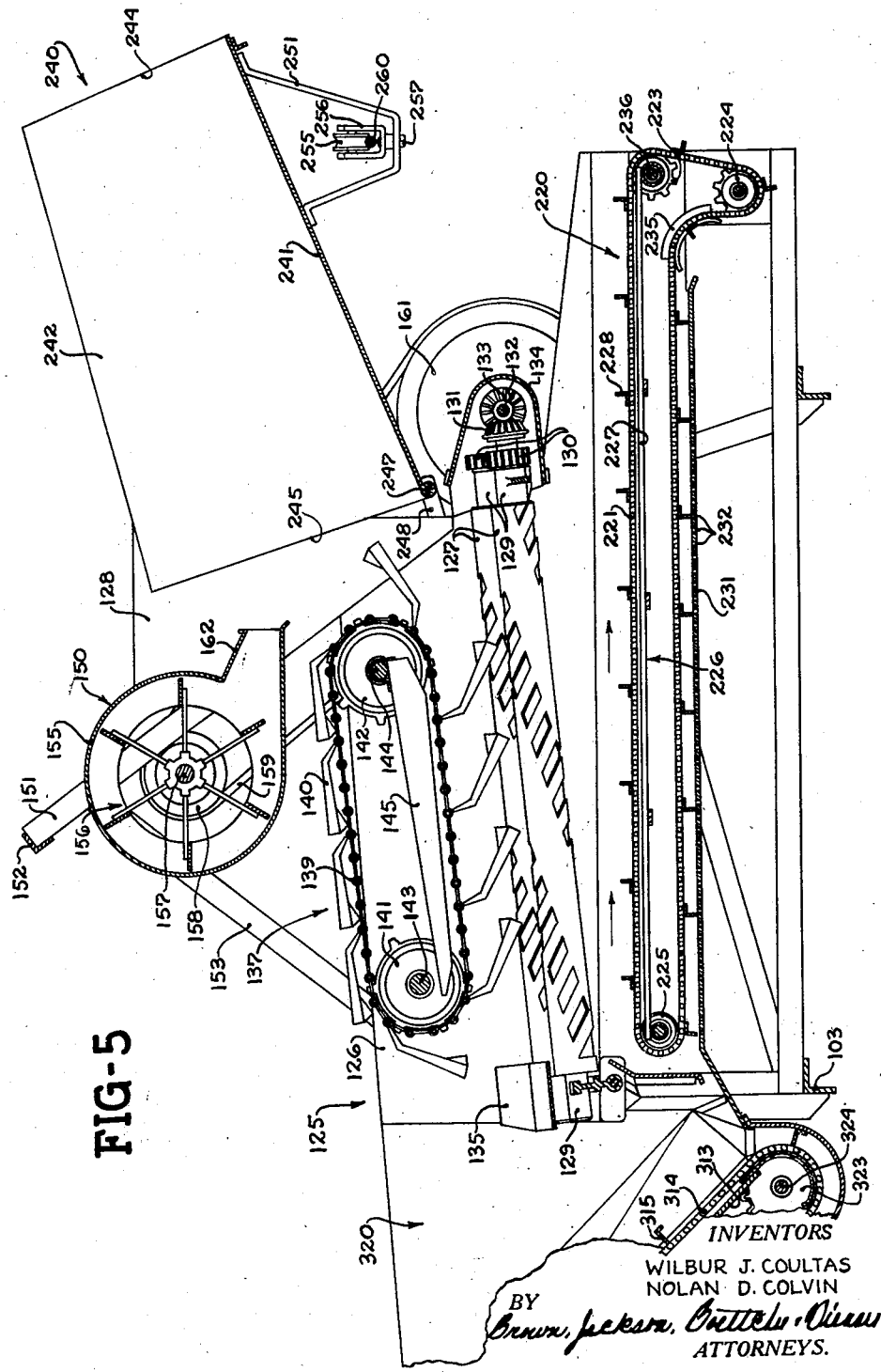

Patented Aug. 13, 1940

2,210,973

UNITED STATES PATENT OFFICE 2,210,973

CORN PICKER

Wilbur J. Coultas and Nolan D. Colvin, Moline, Ill., asssignors to Deere & Company, Moline, Ill., a corporation of Illinois Application January 12, 1939, Serial No. 250,516

24 Claims. (Cl. 56—18)

This invention relates generally to corn pickers and is more particularly concerned with corn pickers of the two-row pull type machine adapted to be propelled by, and to derive operating power from, a farm tractor.

The object and general nature of this invention is the provision of a corn picker in which the snapping rolls and ear elevator are mounted on a frame that is rigidly secured to the axle of the machine, and in which the husking mechanism is supported on a generally fore and aft extending draft frame that is pivotally connected to the axle.

One of the advantages of this construction is that, by fixing the snapping roll frame rigidly to the axle and pivoting the snapping roll and elevator mechanism and the rigidly connecting axle for generally vertical movement about the axis of the supporting wheels relative to the draft frame which carries the husking mechanism, an extremely rigid and sturdy machine is provided. It is desirable to have the husking unit remain substantially level so as to operate to the best advantage, and this result is secured in the present invention by mounting the husking unit on the draft frame. Normally, the draft frame remains in substantially horizontal position, thus maintaining the husking unit level, while the vertically swinging movement of the snapping roll unit, which is provided so as to adjust the forward ends of the snapping rolls closer to or further away from the ground, takes place about the axis of the ground wheels and the rigid axle to which the snapping roll frame is rigidly connected. Adjustment of the snapping roll unit to vary the height of operation thereof does not change the portion of the husking unit and draft is applied to the snapping roll unit to propel the same along the row or rows in direct manner, namely, through the rigid axle to which the frame of the snapping roll unit is rigidly fixed. The axle, which is strongly constructed so as to support the weight of the unit can thus serve without additional bracing and other additional parts which usually are necessary where the pivot axis between the snapping roll frame and the relatively stationary portion of the machine is placed away from the axle axis.

Another feature of this invention is the provision of a new and improved husking roll hopper, one end of the hopper being supported on the relatively stationary husking unit while the other end is supported on the pivotally mounted snapping roll unit in a position to receive ears of corn from the elevator thereof, such support being constructed so as to accommodate the relative movement that takes place between the husking unit and the snapping roll unit while the latter is adjusted relative to the draft frame. In this connection, a further object of this invention is to provide an improved fan construction for removing loose leaves and other trash from the snapped ears of corn as they are conveyed by the hopper or chute from the elevator of the snapping roll unit to the husking roll unit. Specifically, it is an object of this invention to mount the fan so that a blast of air therefrom blows over the ears of corn for substantially the entire distance that they travel in the hopper. Heretofore cleaning fans and the like have been provided, but generally they are arranged to direct the blast of air against the ears of corn as they fall from a chute or similar means into the husking unit. Thus, according to the present invention, the ears of corn are subject to a cleaning blast of air for a much longer period of time than in prior machines, thereby insuring that only clean ears of corn will be delivered to the husking unit.

It is another feature of this invention to provide simplified driving connections for driving the snapping rolls, ear elevator, and husking means from the tractor motor, and to this end the present invention contemplates a transverse drive shaft mounted by suitable means on the snapping roll frame unit closely adjacent the axle to which the frame is rigidly secured, and said transverse shaft is connected to drive the snapping rolls and the elevator, and being in turn driven through suitable universal joint connections from driving means carried by the draft frame, which driving means is directly connected to drive the husking unit carrier by the draft frame.

These and other objects and advantages of the present invention will be apparent to those skilled in the art after a consideration of the following detailed description taken in connection with the accompanying drawings.

Figure 1:
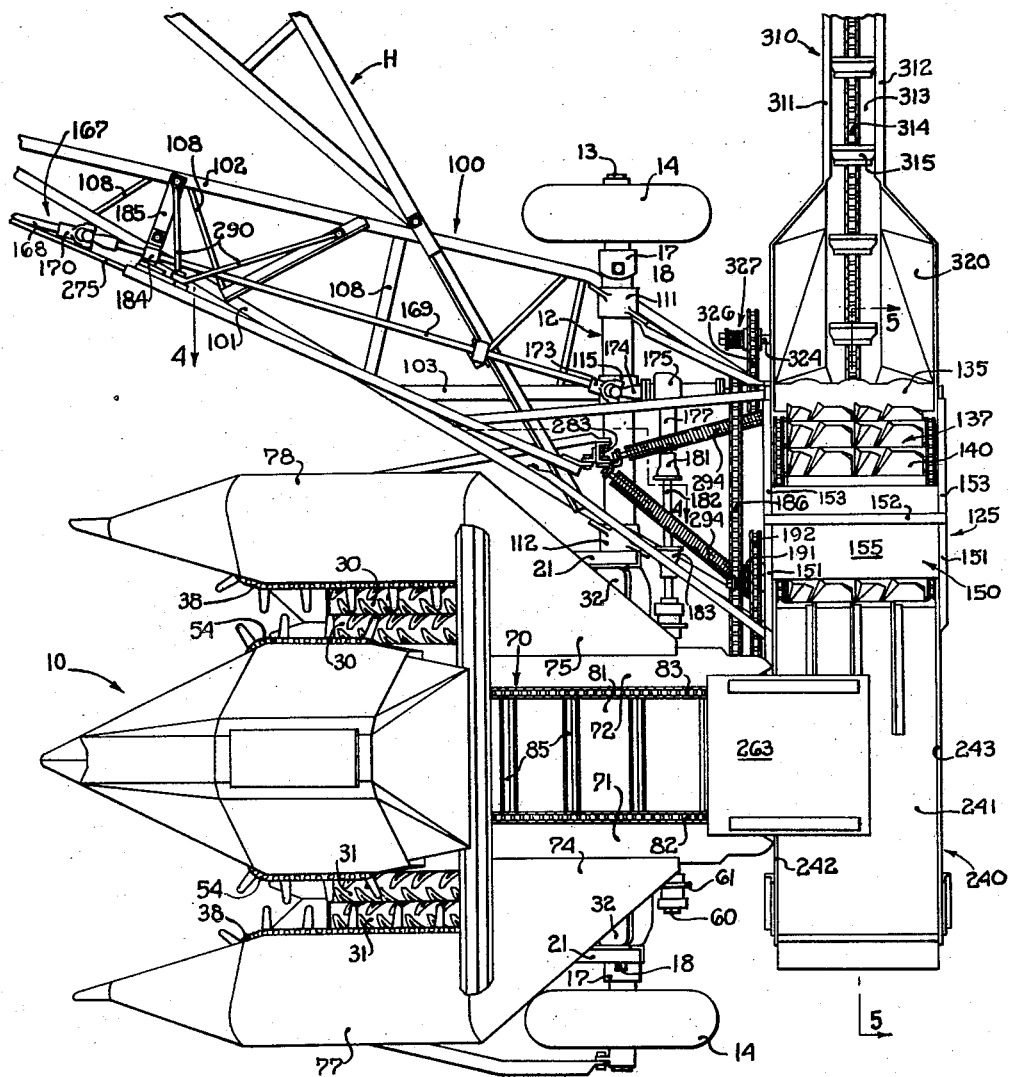
Figure 1 is a plan view of a corn picker constructed according to the principles of the present invention.
Figure 3:
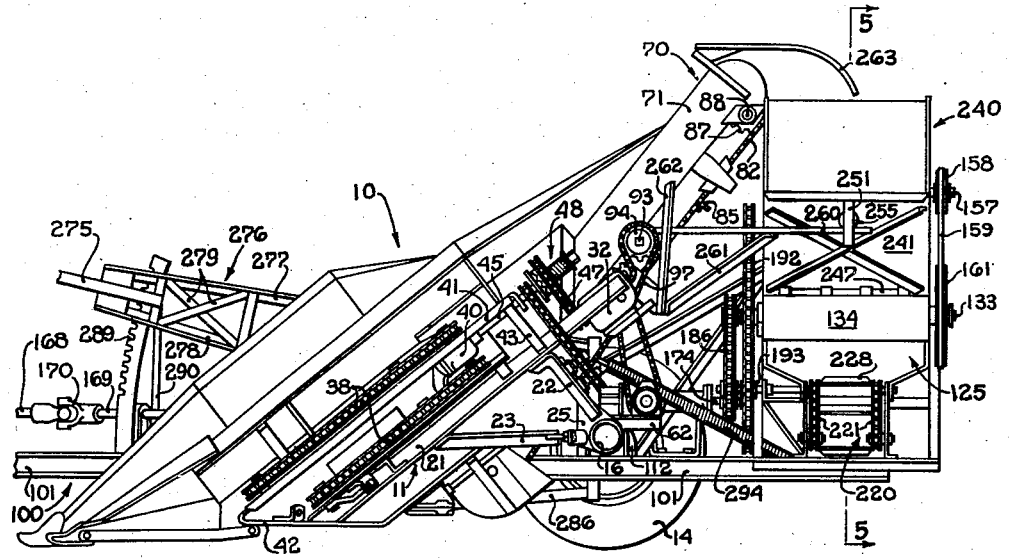
Figure 3 is a side elevation of the corn picker shown in Figures 1 and 2.

Figure 4 is an enlarged fragmentary section taken generally along the line 4—4 of Figure 1, showing certain details of the snapping roll unit and the means for adjusting the latter relative to the draft frame; and Figure 5 is an enlarged sectional view, taken generally along the line 5—5 of Figures 1 and 3.

Figure 2:
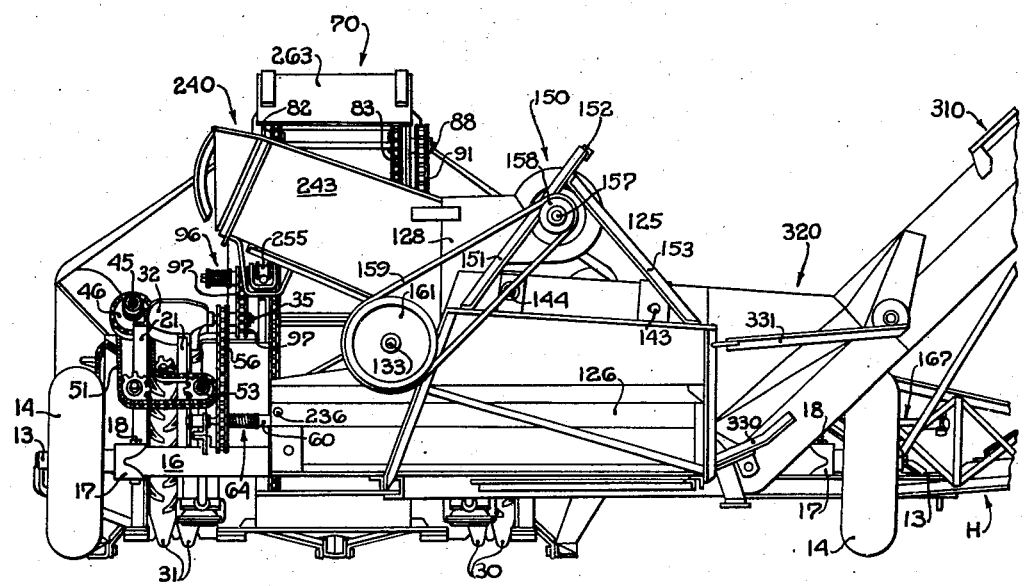
Figure 2 is a rear view of the corn picker shown in Figure 1.

Referring now more particularly to Figures 1, 2 and 3, the picking or snapping roll unit is indicated in its entirety by the reference numeral 10 and is adapted to be pulled by a tractor. The latter also pulls a wagon through a suitable hitch H. The snapping roll unit 10 includes a supporting framework, indicated generally in Figure 3 by the reference numeral 11, which is supported on a transverse axle 12. A spindle 13 (Figure 1) is fixed to each end of the axle 12 and receives a ground wheel 14 which is journaled for rotation on the spindle by suitable bearing means. The axle 12 preferably comprises a strong, rigid pipe or tube 16, best shown in Figures 3 and 4. Collars 17 are bolted, as at 18 (Figure 2), to the ends of the pipe 16, and the collars 17 receive the spindles or stub axles 13.

The snapping roll frame 11, which also carries the first elevator that delivers the ears of corn from the snapping mechanism to the husking mechanism, consists of inner and outer snapping roll frame angles 21 which are fixed in downwardly and forwardly inclined position to upwardly and forwardly extending brackets 22 and longitudinally extending adjustable angle braces 23. Each bracket 22 and the associated adjustable angle brace 23 is bolted or otherwise fixed to a plate 25 that is welded to the axle pipe 16.

The snapping roll angles 21 of the framework 11 support two pairs 30 and 31 of snapping rolls, the upper ends of the rolls of each pair being journaled for rotation in a snapping roll gear housing 32 that is bolted, as at 34 (Figure 4), to the upper ends of the angles 21. The snapping rolls of each pair are connected by suitable gears in the associated housing 32, such gearing including a transverse shaft 35 that extends laterally inwardly of the picking unit 10 from each housing 32. A pair of laterally outer gatherer chains 38 are mounted on suitable sprockets and carried in any suitable manner by the framework 11, the upper sprockets upon which the chains 38 are supported being fixed to a shaft 39 that is carried by a gatherer chain drive housing 40, and the housing 40 is supported upon a plate 41 (Figure 4) that is fixed by suitable braces 42 and 43 to the frame angle 21. A drive shaft 45 extends upwardly and rearwardly from the gatherer chain drive housing 40 and at its upper end carries a sprocket 46 over which a chain 47 is trained. The sprocket 46 is connected by suitable slip clutch mechanism 48 with the gatherer chain drive shaft 45.

The chain 47 is trained around and driven from a sprocket fixed to one of the snapping roll shafts, and as best shown in Figure 4, a sprocket 50 forward of the slip clutch mechanism 48 receives a chain 51 which extends over suitable idler sprockets and drives a sprocket fixed to a shaft 53 (Figure 2) that drives the inner gatherer chain 54 (Figure 1). The shaft 35 of the snapping roll drive housing 32 is driven by a sprocket chain 56 from a sprocket 57 (Figure 4) which is fixed to a transverse snapping roll drive shaft 60 which extends alongside and closely adjacent to the axle 12, as best indicated in Figure 2. The shaft 60 is supported by suitable bearings bolted to brackets 61 that are fixed to rearwardly extending angles 62 (Figures 3 and 4), and the angles 62, in turn, are connected to the plates 25 that are welded to the pipe 16. Since there are two sets of snapping rolls, the shaft 60 carries two sprockets 57, and suitable slip clutch means 64 (Figure 2) connects each of the sprockets 57 to the shaft 60.

The elevator that receives the ears of corn from the snapping rolls 30 and 31 is indicated in Figures 2 and 3 by the reference numeral 70 and includes suitable side sheets 71 and 72 which are connected at their lower ends to the upper extensions 74 and 75, respectively, of the laterally outer gatherer sheets 77 and 78. The elevator also includes a bottom sheet 81 over which a pair of elevator chains 82 and 83, connected by flights 85, run. The upper portions of the elevator chains 82 and 83 operate over sprockets 87 (Figure 3) that are fixed to an elevator driving shaft 88. At their lower ends the chains 82 and 83 are trained over suitable sprockets fixed to an idler shaft (not shown). A driving spocket is fixed to the right hand end (Figure 2) of the elevator drive shaft 88 and receives a driving chain 91 which extends downwardly and is trained over a sprocket 92 (Figure 4) fixed to the inner end of a drive shaft 93, the outer end of which receives a sprocket 94 that is connected to the shaft 93 by suitable slip clutch mechanism 96 (Figure 2). The sprocket 94 is driven by a chain 97 which is trained over a sprocket fixed to the shaft 35 (Figure 2) alongside the sprocket that drives the chain 56.

Thus, by virtue of the connections described above, the drive shaft 60 that is carried on the snapping roll frame 11 closely adjacent the axle 12 serves to drive the snapping rolls 30 and 31, the gatherer chains 38 and 54, and the elevator 70.

The draft frame is indicated in its entirety by the reference numeral 100 and, as shown in Figures 1 and 4, is made up of the channels 101 and 102 and an angle 103 (Figures 1 and 5), the latter being secured at its forward end to the channel 101 and extending substantially directly rearwardly beyond the rear end of the other channel 102 and connected at its rear end by a cross brace to the rear portion of the channel 101. The inner and outer channel members 101 and 102 extend generally longitudinally but diverge rearwardly. The channels 101 and 102 are connected together at their forward ends and are connected by a suitable clevis (not shown) to the tractor draw bar so that the weight of the front end of the draft frame 100 is supported by the tractor. At a number of points the channels 101 and 102 are reinforced by suitable brace angles 108.

The channels 101 and 102 and the angle 103 extend rearwardly beyond the right hand portion of the axle 12, as best shown in Figure 2, and at the points where the channels 101 and 102 pass under the axle, attaching yokes 111 and 112, generally U-shaped in construction, are provided. The yokes 111 and 112 embrace the axle in laterally spaced relation and have fins 113 which are apertured to receive bolts 114 (Figure 4) by which the yokes 111 and 112 are bolted to the channels 101 and 102. A yoke 115 is bolted to the angle member 103, as best indicated in Figure 2. Thus, the yokes 111, 112 and 115 support the weight of the draft frame 100 and associated parts on the axle 12. The yokes 111, 112 and 115 permit the axle 12 to have rocking motion about a transverse axis relative to the draft frame 100, so that the latter is supported on the axle 12 and the tractor and remains generally level during operation.

The rear ends of the draft frame members 101, 102 and 103 overhang rearwardly, as mentioned above, and furnish a convenient support for the husking mechanism, indicated in its entirety in Figures 1, 2 and 3 by the reference numeral 125. The husking unit includes the usual husking box 126, within which conventional husking rolls 127 are mounted for rotation in slightly downwardly inclined position, and side sheets 128 forming a receiving section. The husking rolls are mounted in suitable bearings 129 and at their upper or right hand ends (Figure 5) carry meshing spur gears 130 which cause the rolls 127 to rotate together. The husking rolls are preferably arranged in pairs, and each pair is driven by a bevel gear 131 from a meshing bevel gear 132 fixed to a transverse drive shaft 133. The gears 130, 131 and 132 are enclosed by a shield or housing 134. The lower bearings 129 for the husking rolls are protected by a shield 135 fixed to the sides of the husking box 126 in any suitable manner.

Disposed over the husking rolls is an ear retarder unit indicated in its entirety by the reference numeral 137. The ear retarder unit 137 consists of a pair of chains 139 and suitable retarder plates 140 connected by rods to the chains 139. The chains operate over pairs of sprockets 141 and 142 fixed, respectively, to shafts 143 and 144. Each of the retarder plates 140 carries an arm (not shown) which operates in conjunction with a pair of ear retarder compression arms 145 which are adjustable to control the positions of the ear retarder plates 140 as they pass over the husking rolls 127. This adjusts the retarders to the condition of the corn. The retarder 137 provides a positive uniform feed for the ears of corn as they pass over the husking rolls, increases the capacity of the latter and, at the same time, tends to force any stalks and trash through the husking roll unit so as to prevent clogging.

Disposed above the ear retarder 137 is a fan 150 which is mounted on a pair of upwardly and laterally extending angles 151 connected across the top of the fan by an angle 152 and braced by downwardly inclined angles 153, as indicated in Figures 1 and 5. The fan 150 includes a fan casing 155 within which a fan rotor 156 is mounted for rotation, the rotor including a fan shaft 157. A pulley 158 is fixed to one end of the fan shaft 157 and receives a belt 159 which at its lower end passes over a pulley 161 that is fixed to one end of the husking roll drive shaft 133. The discharge throat 162 of the fan is arranged to direct a blast of air over the ears of corn as they move toward the husking rolls 127.

The drive for the snapping roll unit 10 and the husking mechanism 125 is derived from a power or drive shaft indicated in Figure 1 by the reference numeral 167 which includes shaft sections 168 and 169 connected together by a universal joint 170. The shaft section 168 at its forward end is suitably coupled to the power take-off shaft of the tractor, and the rear end of the other shaft section 169 is connected by a universal joint 173 to a shaft 174 that extends forwardly from a drive housing 175 which is fixed in any suitable manner to the longitudinally extending angle 103 which is secured to the draft frame 100. A sleeve extension 177 receives a transverse shaft section that is connected by bevel gear means to the longitudinally disposed shaft 174, and the transverse shaft just mentioned is connected by means of a universal joint 181 (Figure 1) to a short shaft 182 which at its other end is connected by a universal joint 183 to the shaft 60 that drives the snapping rolls, gatherer chains and first elevator, as described above. The power shaft 167 is supported at an intermediate point by suitable bearing means supported in a bracket 184 secured to a plate 185 that is bolted to the draft frame 100.

The longitudinally disposed shaft 174 supported within the housing 175 carries a sprocket at its rear end over which a chain 186 is trained, the upper end of the latter being trained over a sprocket fixed to the left hand end (Figure 3) of the shaft 133 which receives the pulley 161, described above. The ear retarder shaft 144 carries at its inner end (Figure 1) a sprocket that is connected to the shaft by a slip clutch mechanism 191 and which receives a chain 192 that is trained over a sprocket fixed to the husking roll shaft 133 (Figures 3 and 5) inside the sprocket over which the upper end of the chain 186 (Figure 3) is trained, the chain 186 being the driving chain by which the husking rolls and the ear retarder and fan are driven, as described above. The chain 192 also extends downwardly over a sprocket for driving the husk conveyor as will be described below.

The husking unit 125 also includes a husk conveyor 220 which comprises a pair of endless chains 221 operating over sprockets 223 and 224 at one end and over a roller 225 at the other end. A shelf 226 that consists of rods 227 supports the upper run of the conveyor, which moves in the direction of the arrow shown in Figure 5, and flights 228 are carried by the chains 221 and operate over the rods 227. A husk conveyor of this general type is disclosed and claimed in the patent to Louis A. Paradise 1,925,275, issued September 5, 1933. The lower run of the husk conveyor 220 operates over a conveyor pan 231 which has a number of small holes 232 formed therein. Any shelled corn coming over with the ears into the husking unit 125 drops between the rods 227 and onto the pan from which the flights 228 move the shelled corn toward the wagon elevator. The small holes 232 in the conveyor pan assist in removing any dirt and the like from the shelled corn. Curved guide angles 235 are provided for guiding the drag chains 221 in their movement from the lower idler sprockets 224 up onto the conveyor pan 231. The chain 192 (Figure 3) extends downwardly from the sprocket on the husking roll drive shaft 133 and passes around a sprocket fixed to the shaft 236 upon which the husk conveyor drive sprockets 223 are mounted.

Since the husking unit 125 is supported on the draft frame 100, which remains generally level in operation, the drive from the tractor motor is delivered by the power shaft 167 smoothly and positively to the mechanisms of the husking unit. Also, the power is delivered to the mechanisms of the snapping roll unit through the shaft 182 and associated universal joints 181 and 183, the latter accommodating the angular movement of the snapping roll unit 10 relative to the draft frame when the forward ends of the snapping roll unit is adjusted. Disposing the shaft 182 closely adjacent the axle 10, which constitutes the pivot axis about which the picker unit 10 moves with respect to the draft frame 100, materially reduces the angular displacement to which the shaft 182 is subjected when the picker unit is adjusted.

The means for receiving the snapped ears of corn from the snapping roll unit and conveying or discharging them into the husking unit 125 is indicated in its entirety by the reference numeral 240 and, as best shown in Figures 1, 2 and 5, comprises a chute or hopper having a bottom 241 and sides 242 and 243, the upper and lower ends 244 and 245 being open. One end of the husking roll hopper 240 is pivotally mounted on a rod 247, the ends of which are fixed to two brackets 248 (Figure 5) fixed in any suitable manner to the sides of the husking roll hopper. The other end of the husking roll hopper is provided with a generally U-shaped bracket 251, the ends of which are bolted or otherwise secured to the hopper bottom 241. If desired, a plate may be secured to the hopper bottom at this point to reinforce the points of connection. A roller or sheave 255 is mounted for rotation on a yoke 256 which is swiveled to the intermediate portion of the bracket 251 by a pivot bolt 257. A hopper support rod 260 (Figure 3) is bolted to one side of the elevator 70 and includes a supporting brace 261 which is connected at its lower end to a frame angle 262. A hood 263 is fixed to the upper end of the elevator 70 and directs the ears of corn into the hopper 240.

As will be clear from Figure 5, the fan 150 is disposed so that its discharge throat 162 directs a blast of air into the hopper 240 at the lower end 245 thereof, the air being directed against the bottom of the hopper more or less uniformly over the entire mass of corn ears coming over from the elevator 70 and directed by the chute or hopper into the husking rolls 126. In some prior constructions, the cleaning fan directs a blast of air across the ears of corn as they fall from a chute or the like, but according to the present invention the air blast from the fan 150 operates on the ears of corn for a much longer period of time, thereby assuring complete removal of all leaves, trash and the like, blowing the same out through the open upper end 244. Thus, whenever the picker unit 10 is adjusted vertically by swinging the unit and the axle relative to the draft frame about a transverse axis, the upper end of the hopper 240 moves with the wagon elevator, thereby remaining in operative position with respect to the latter to receive corn therefrom at all times, while the lower end pivots on the rod 247 relative to the receiving section 128 of the husking box 126.

The position of a picker unit 10 relative to the longitudinally extending draft and husker supporting frame is controlled by means of a forwardly extending hand lever 275 which is fixed at its rear end to a frame 276 that includes upper and lower angles 277 and 278 and associated cross braces 279. The rear ends of the tilting lever angles 277 and 278 are bolted to the forwardly disposed flange of an angle 281 which, in turn, is bolted to an upright channel or standard 283 which is welded, as at 284, to the axle pipe 16. The channel 283 extends below the axle and receives an adjustable angle brace 286, the forward end of which is adjustably secured, as at 287, to the lower ends of the snapping roll frame members 21 and 41. The handle 275 constitutes a rigid extension of the frame 276 and carries latch mechanism which cooperates with a notched sector 289, the lower end of which is fixed in any suitable manner to a draft frame 100, preferably, to one of the plates 185 to which the bracket 184 supporting the forward portion of the power shaft 167 is connected. A pair of rods 290 are secured to the upper end of the sector 289 and are bolted to the draft frame 100 to brace the sector 289. A pair of counterbalancing springs 294 (Figure 1) are fixed to brackets 295 (Figure 4) carried at the upper end of the standard 283, and the lower ends of the springs 294 are connected to the rear portion of the draft frame underneath the husking unit 125. Thus, the springs 294 serve to balance the weight of the forward portion of the picker unit 10 against the weight of the husking unit 125 at the rear of the draft frame.

The wagon elevator is indicated in its entirety by the reference numeral 310 and comprises sides 311 and 312, and a bottom 313 over which a conveyor chain 314 moves. The chain 314 is provided with flights 315. The elevator 310 includes a wagon elevator hopper 320 (Figure 5) which is positioned to receive the ears of corn as they are discharged from the husking rolls 126. The lower end of the elevator chain 314 is trained over a sprocket 323 supported on a shaft 324. The wagon elevator shaft 324 is driven by a sprocket chain 326 (Figure 1) which is trained over a sprocket wheel connected by a slip clutch 327 to the forwardly extended portion of the shaft 324.

The wagon elevator is supported by suitable angles 330 which are fixed to the front and rear sides of the husking unit 125. The wagon elevator is braced by angles 331 (Figure 2). Other brace rods may be provided as required.

The operation of the machine described above is substantially as follows:

The picker unit 10 is rigidly carried at the left end of the rigid axle 12, the picker and axle pivoting as a unit about the axis of the supporting wheels 14 when the lever 275 is adjusted to raise or lower the front ends of the picked unit relative to the draft frame. During this relative movement, the swiveled roller support of the upper end of the husker hopper 240 accommodates the slight pivoting of the hopper about the rod 247 upon which the lower end of the hopper is supported. The power takeoff shaft of the tractor is connected to drive the power shaft 167 which, in turn, drives the two shafts journaled for rotation in the drive housing 175. The shaft 174 drives the mechanisms of the snapping roll unit through the transverse shaft 182 and associated universal joints, and the other shaft carried within the drive housing 175 is connected through suitable sprocket chains to drive the mechanisms of the husking unit and the wagon elevator. Since the husking unit is supported on the draft frame 100, which usually remains level, the husking rolls 127 are all disposed at the right angle to work efficiently and quickly, adjustments of the picking unit relative to the draft frame having no effect upon the position of the husking rolls. In some machines where the husking mechanism is carried by and moves with the picker unit, raising the gatherer points of the picking unit sometimes places the husking mechanism objectionably close to the ground. This is avoided in the present construction. The entire implement is made strong and sturdy by the rigid connection of the snapping roll frame with the transversely extending axle, and the disposition of the tilting axis between the picking unit and the draft frame and associated husking mechanism in the axis of the supporting wheels provide for simplified connections between the power shaft and the various mechanisms to be driven thereby.

While we have shown and described above the preferred structure in which the principles of the present invention have been embodied, it is to be understood that our invention is not to be limited to the specific details shown and described, but that, in fact, widely different means

What we claim, therefore, and desire to secure by Letters Patent is:

1. A corn picker comprising a transverse axle, supporting wheels journaled for rotation on the ends of the axle, a picking unit frame fixed rigidly to said axle, a second frame connected to the axle for rocking movement relative thereto about the axis of said axle, and a husking unit supported on said second frame.

2. A corn picker comprising a snapping roll unit, ground wheels supporting the latter and said snapping roll unit being swingable vertically about the axis of said ground wheels, a draft frame connected with said second unit for pivotal movement relative to said snapping roll unit about the axis of said supporting wheels, and a husking unit carried by said draft frame and adapted to receive ears of corn from said snapping roll unit.

3. A corn picker comprising a transverse axle, ground wheels journaled for rotation on the ends thereof, a picker unit including a frame forwardly from and rigidly fixed to said axle, a second frame extending generally longitudinally fore and aft of said axle and mounted for pivotal movement on the latter, a husking unit carried rearwardly of said axle on said second frame, the forward portion of the later serving as a draft frame, and means connected between said picker frame and said second frame for adjusting the height of said picker frame relative to the ground.

4. A corn picker comprising a transverse axle, supporting wheels journaled for rotation on the ends of the axle, a generally forwardly extending snapping roll frame fixed rigidly to said axle at one side thereof, a second frame extending generally longitudinally fore and aft of said axle and connected to the latter for rocking movement relative thereto, a husking unit supported on said second frame rearwardly of said axle, and spring counterbalancing means extending from said snapping roll frame to said second frame.

5. A corn picker comprising a transverse axle member, supporting wheels journaled for rotation at the ends of said axle, a snapping roll unit comprising a snapping roll frame fixed in rigid relation to said axle, two pairs of laterally spaced snapping rolls journaled for rotation on said frame, and a central elevator supported on said snapping roll frame and extending rearwardly from a point between said pairs of snapping rolls, a second frame pivotally mounted on said axle at one side of said snapping roll frame and extending fore and aft of said axle, means for adjusting said snapping roll frame vertically relative to said second frame, and a husking unit supported at the rear end of said second frame in a position to receive ears of corn from said central elevator in any position of adjustment of said snapping roll frame relative to said second frame.

6. A corn picker comprising a rigid axle member, ground wheels journaled on the ends of said axle member, a snapping roll frame rigidly secured to said axle adjacent one end thereof and including snapping rolls and elevator means, a draft frame pivotally supported on said axle adjacent the other end thereof and extending generally fore and aft of said axle, a husking unit supported adjacent the rear portion of said draft frame in a position to receive ears of corn from said elevator, a notched sector connected with said draft frame, and an adjusting lever fixed rigidly to said axle member alongside said draft frame and adapted to be latched to said sector for adjustably fixing the position of said snapping roll frame relative to said draft frame and husking unit, movement of said lever swinging said axle and snapping roll frame about the axis of said supporting wheels relative to said draft frame and said husking unit.

7. A corn picker comprising a rigid transversely disposed axle, supporting wheels journaled at the ends of said axle, a plurality of plates rigidly secured to said axle in laterally spaced relation, a snapping roll frame rigidly secured to said plates and swingable generally vertically when said axle is rocked about the axis of said supporting wheels, snapping rolls and elevating mechanism carried by said snapping roll frame, a draft frame extending generally fore and aft of said axle and connected therewith for relative rocking movement, a husking unit carried at the rear end of said draft frame and positioned thereon to receive ears of corn discharged from said elevator, a standard rigidly fixed to said axle between said draft frame and said snapping roll frame, a generally fore and aft extending frame fixed at its rear end to said rigid standard and disposed generally alongside said draft frame, a lever fixed to said fore and aft extending frame, a notched sector fixed to said draft frame, and latch means carried by said lever for adjustable engagement with said sector, movement of said lever toward and away from said draft frame serving to raise and lower the forward portion of said snapping roll frame and to rock the latter and said axle about the axis of said supporting wheels relative to said draft frame and said husking unit.

8. A corn picker comprising a rigid transversely disposed axle, supporting wheels journaled at the ends of said axle, a plurality of plates rigidly secured to said axle in laterally spaced relation, a snapping roll frame rigidly secured to said plates and swingable generally vertically when said axle is rocked about the axis of said supporting wheels, snapping rolls and elevating mechanism carried by said snapping roll frame, a draft frame extending generally for and aft of said axle and secured thereto for relative rocking movement, a husking unit carried at the rear end of said draft frame and positioned thereon to receive ears of corn discharged from said elevator, a standard rigidly fixed to said axle between said draft frame and said snapping roll frame, counterbalancing springs extending from the upper end of said rigid standard downwardly and rearwardly to the rear portion of said draft frame so as to utilize the weight of said husking unit to balance the weight of the snapping roll unit, a generally fore and aft extending frame rigidly fixed at its rear end to said standard, a lever fixed to the forward end of said fore and aft extending frame, a sector connected with said draft frame, and latch means carried by said lever and adjustably engageable with said sector, movement of said lever serving to rock said snapping roll frame relative to said draft frame about the axis of said supporting wheels.

9. A corn picker comprising a snapping roll unit including a frame, snapping rolls journaled thereon and an elevator for receiving the snapped ears of corn, a husking unit including a frame supported for movement relative to said snapping roll frame, and a hopper connected at its opposite ends to said husking unit and snapping roll unit, respectively.

10. A corn picker comprising a snapping roll unit including a frame, snapping rolls journaled thereon and an elevator for receiving the snapped ears of corn, a husking unit including a frame supported for movement relative to said snapping roll frame, and a hopper pivoted at one end to one of said units and flexibly supported at its other end on the other of said units for conveying ears of corn to said husking unit in any position of said snapping roll unit relative to said husking unit.

11. A corn picker comprising a transverse rigid axle, a snapping roll unit including a snapping roll frame rigidly fixed to said axle, snapping rolls journaled for rotation on said frame and an elevator for conveying ears of corn rearwardly from said snapping rolls, a draft frame pivotally connected to said axle and having a portion extending rearwardly thereof, a transversely disposed husking unit carried at the rear end of said driving frame, said snapping roll frame and axle being rockable about the axis of said supporting wheels relative to said draft frame for raising and lowering the front end of said snapping roll frame, a transversely disposed hopper pivotally connected at one end to said husking unit, a member rigidly connected at its forward portion to said snapping roll frame and extending rearwardly therefrom, and a roller having a swiveled connection with the other end of said hopper and supporting said other end of the latter on said rearwardly extending member so as to accommodate the relative movement between said hopper and said snapping roll unit when the latter is rocked about the axis of said supporting wheels relative to said husking unit.

12. In a corn picker, a snapping roll unit, husking mechanism, a hopper for delivering ears of corn from the snapping roll unit to said husking mechanism, and a fan arranged to discharge a blast of air into the hopper for removing leaves and other loose material coming over from the snapping roll unit with the ears.

13. In a corn picker, the combination with a husking unit and a hopper for delivering ears of corn to the husking unit, of a fan supported by said husking unit and arranged to direct a blast of air backward over the ears of corn moving down the hopper toward the husking mechanism so as to remove leaves and other loose material.

14. In a corn picker, a husking roll unit, a hopper for delivering ears of corn thereto, means supporting one end of said hopper on said husking unit, an ear retarder disposed above the husking rolls, and an air fan disposed above said ear retarder and having a discharge throat arranged to direct a blast of air over one end of the ear retarder toward the discharge end of said hopper to remove leaves and other loose material moving toward the husking rolls with the ears of corn, said blast of air being directed generally uniformly over the entire bottom of the hopper.

15. A corn picker comprising a snapping roll mechanism including an elevator, a husking roll unit, a hopper disposed in an inclined position for receiving ears of corn at its upper end from said elevator and delivering the ears at its lower end to said husking mechanism, and a fan arranged to direct a blast of air onto said ears for substantially all of the time during operation that the ears remain in said hopper.

16. A corn picker comprising a transverse axle, ground wheels journaled for rotation on the ends thereof, a picker unit including a frame extending forwardly from and rigidly fixed to said axle, a generally longitudinally extending second frame mounted for pivotal movement on the axle, a drive shaft supported on said generally longitudinally extending frame, a drive shaft supported on said snapping roll frame adjacent the axis of said axle, and universal joint connections between said two drive shafts accommodating motion of said second drive shaft with said snapping roll frame relative to said longitudinally extending frame and said first drive shaft supported thereby.

17. A corn picker comprising a transverse axle, ground wheels journaled for rotation on the ends thereof, a picker unit including a frame extending forwardly from and rigidly fixed to said axle, a generally longitudinally extending second frame mounted for pivotal movement on the axle, a longitudinally extending power shaft supported for rotation on said second frame, a gear housing on the latter, gears in said housing connected to said power shaft, a transversely disposed drive shaft connected to said gears for receiving power therefrom, a second transversely disposed drive shaft supported on said snapping roll frame adjacent the axis of said axle, and universal joint connections between said two drive shafts accommodating motion of said second drive shaft with said snapping roll frame relative to said longitudinally extending frame and said first drive shaft supported thereby.

18. A corn picker comprising a transverse axle, ground wheels journaled for rotation on the ends thereof, a picker unit including a frame extending forwardly from and rigidly fixed to said axle, a second frame extending generally longitudinally fore and after of said axle and mounted for pivotal movement on the latter, a husking unit carried rearwardly of said axle on said second frame, a drive housing supported on said generally longitudinally extending frame, gear means disposed therein, a pair of shafts supported for rotation in said housing and receiving said gear means, a transverse shaft supported on said picker frame closely adjacent to the axis of said axle, universal joint means connected with one of said first mentioned shafts for driving said transverse shaft, and means for driving said husking unit from the other of said pair of shafts.

19. The combination set forth in claim 18 wherein an elevator is carried on said picker frame and is driven by suitable connections from said transverse shaft.

20. A corn picker comprising a transverse axle, ground wheels journaled on the ends of said axle, a snapping roll frame rigidly secured to said axle, a generally longitudinally extending draft frame having rocking connection with said axle and extending rearwardly therefrom, adjusting means acting between said draft frame and said snapping roll frame for rocking the latter on said axle relative to said draft frame to raise and lower the front portion of said snapping roll frame, snapping roll mechanism carried by the latter, an elevator for receiving ears of corn from said mechanism and also carried by said snapping roll frame, husking means carried by said draft frame rearwardly of said axle and in a position to receive ears of corn from said elevator, a transverse shaft supported on said axle, means for driving said snapping roll mechanism from said shaft, means for driving said elevator from said driving means, a power shaft supported on said draft frame, means including universal joint means for driving said transverse shaft from said power shaft, said universal joint means accommodating angular movement of said snapping roll frame and axle relative to said draft frame, and means for driving said husking means from said power shaft.

21. A corn picker as defined in claim 20 wherein a wagon elevator is supported on said draft frame and is driven by said power shaft.

22. A corn picker comprising snapping mechanism, conveying mechanism extending rearwardly therefrom, a husking unit including a plurality of transversely extending husking rolls disposed behind said snapping mechanism, a hopper disposed behind said conveying mechanism and inclined laterally downwardly toward said husking mechanism for receiving ears of corn from said conveying mechanism and delivering the ears to said husking mechanism, and a fan arranged to direct a blast of air upwardly through the hopper and transversely of the direction of travel of the ears of corn from said snapping mechanism.

23. A corn picker comprising longitudinally extending snapping rolls, an endless conveyor disposed alongside said rolls and movable rearwardly and upwardly therefrom, a plurality of husking rolls disposed transversely at the rear of said snapping rolls, a transversely disposed hopper inclined laterally downwardly under the rear end of said conveyor toward said husking rolls and arranged to receive ears of corn which are dropped from said conveyor and to deliver them laterally to said husking rolls, and a fan arranged to direct a blast of air through said hopper from said husking rolls transversely under the end of said conveyor.

24. A corn picker comprising longitudinally extending snapping rolls, an endless conveyor disposed alongside said rolls and movable rearwardly and upwardly therefrom, a plurality of husking rolls disposed transversely at the rear of said snapping rolls and offset at one side thereof, a transversely disposed hopper inclined laterally downwardly under the rear end of said conveyor toward said husking rolls and arranged to receive ears of corn which are dropped from said conveyor and to deliver them laterally to said husking rolls, and a fan mounted above said husking rolls for directing a blast of air through the hopper against the movement of corn therein and transversely of the stream of corn falling from the conveyor.

WILLIAM J. COULTAS.
NOLAN D. COLVIN.